(12) United States Patent
Stählin et al.

(10) Patent No.: US 11,223,706 B2
(45) Date of Patent: Jan. 11, 2022

(54) COMMUNICATION SYSTEM FOR VEHICLE-TO-ENVIRONMENT COMMUNICATION

(71) Applicant: CONTINENTAL AUTOMOTIVE GMBH, Hannover (DE)

(72) Inventors: Ulrich Stählin, Eschborn (DE); Marc Menzel, Weimar (Lahn) (DE); Stefan Götz, Kronberg/Taunus (DE); Martin Schürmeier, Regensburg (DE); Anselm Keil, Hofheim (DE); Sven Kretschmar, Gustavsburg (DE); Richard Owen, Regensburg (DE); Klaus Rink, Rodenbach (DE)

(73) Assignee: Continental Automotive GmbH, Hannover (DE)

(*) Notice: Subject to any disclaimer, the term of this patent is extended or adjusted under 35 U.S.C. 154(b) by 307 days.

(21) Appl. No.: 14/430,060

(22) PCT Filed: Aug. 1, 2013

(86) PCT No.: PCT/EP2013/066206
§ 371 (c)(1),
(2) Date: Mar. 20, 2015

(87) PCT Pub. No.: WO2014/044454
PCT Pub. Date: Mar. 27, 2014

(65) Prior Publication Data
US 2015/0237561 A1    Aug. 20, 2015

(30) Foreign Application Priority Data
Sep. 21, 2012 (DE) .................. 10 2012 217 085.5

(51) Int. Cl.
*H04L 29/06* (2006.01)
*H04L 29/08* (2006.01)
(Continued)

(52) U.S. Cl.
CPC ............ *H04L 69/12* (2013.01); *G06F 9/46* (2013.01); *H04L 69/32* (2013.01); *H04W 12/08* (2013.01); *H04W 40/02* (2013.01)

(58) Field of Classification Search
CPC .......... G06F 9/46; H04W 12/08; H04W 40/02
(Continued)

(56) References Cited

U.S. PATENT DOCUMENTS

| | | | |
|---|---|---|---|
| 2007/0008978 A1 | 1/2007 | Pirzada et al. | |
| 2010/0017543 A1* | 1/2010 | Preston | G06F 11/2035 710/16 |

(Continued)

FOREIGN PATENT DOCUMENTS

| | | |
|---|---|---|
| CN | 101431784 | 5/2009 |
| CN | 201716871 U | 1/2011 |

(Continued)

OTHER PUBLICATIONS

IEEE802.11 Standard; IEEE Standard for Information technology—Telecommunications and information exchange between systems—Local and metropolitan area networks—Specific requirements Part 11: Wireless LAN Medium Access Control (MAC) and Physical Layer (PHY) Specifications.*
(Continued)

*Primary Examiner* — Kibrom T Hailu
*Assistant Examiner* — Nizam U Ahmed
(74) *Attorney, Agent, or Firm* — Cozen O'Connor

(57) ABSTRACT

In a communication system for vehicle-to-environment communication, data to be transmitted is transmitted wirelessly as data packets. The system includes a communication unit and an application unit which are in contact with one another via an internal communication link, the communication unit having a high-frequency antenna and a transceiver for physical data transmission, in addition to a data
(Continued)

processor for controlling the physical transmission. The application unit has at least one data processor configured to execute application programs, to control the access of the application programs to the vehicle-to-environment communication and to execute data communication security applications. The data processor of the application unit is configured to forward the data packets including the routing between communication users and to segment the data stream.

10 Claims, 2 Drawing Sheets

(51) Int. Cl.
*G06F 9/46* (2006.01)
*H04W 12/08* (2021.01)
*H04W 40/02* (2009.01)

(58) Field of Classification Search
USPC .................................................. 370/338
See application file for complete search history.

(56) References Cited

U.S. PATENT DOCUMENTS

| | | | | |
|---|---|---|---|---|
| 2010/0049819 | A1* | 2/2010 | Hamada | H04L 67/322 709/207 |
| 2012/0239294 | A1 | 9/2012 | Staehlin et al. | |
| 2012/0323431 | A1* | 12/2012 | Wong | G01C 21/206 701/25 |
| 2013/0311547 | A1* | 11/2013 | Foti | H04W 4/029 709/203 |
| 2013/0311804 | A1* | 11/2013 | Garg | G06F 1/3203 713/320 |
| 2013/0325940 | A1* | 12/2013 | Foti | H04W 4/046 709/204 |
| 2014/0037228 | A1* | 2/2014 | Lefebvre | G01R 33/5608 382/304 |

FOREIGN PATENT DOCUMENTS

| | | |
|---|---|---|
| CN | 102468864 | 5/2012 |
| CN | 102577320 | 7/2012 |
| DE | 10 2010 028 871 | 1/2011 |
| WO | WO 03/100614 | 12/2003 |
| WO | WO 2008/005793 | 1/2008 |

OTHER PUBLICATIONS

ETSI TS 102 637-2 V1.2.1; Mar. 2011; Intelligent Transport Systems (ITS); Vehicular Communications; Basic Set of Applications; Part 2: Specification of Cooperative; Mar. 2011; Technical Specification; (Year: 2011).*
Wikipedia, "OSI-Modell", Version vom Oct. 9, 2012, pp. 1-7.
Papadimitratos et al. "Vehicular Communication Systems: Enabling technologies, applications, and future outlook on intelligent transportation", IEEE Communications Magazine, IEEE Service Center, Piscataway, BD. 47, Nr. 11, 1. Nov. 1, 2009, pp. 84-95.

* cited by examiner

COMMUNICATION SYSTEM FOR VEHICLE-TO-ENVIRONMENT COMMUNICATION

CROSS-REFERENCE TO RELATED APPLICATIONS

This is a U.S. national stage of application No. PCT/EP2013/066206, filed on 1 Aug. 2013, which claims priority to the German Application No. DE 10 2012 217 085.5 filed 21 Sep. 2012, the content of both incorporated herein by reference.

BACKGROUND OF THE INVENTION

1. Field of the Invention

The invention relates to a communication system for vehicle-to-environment communication in which data to be transmitted are transmitted wirelessly as data packets, particularly on the basis of the IEEE 802.11p standard.

According to an aspect of the invention, the communication system is equipped with a communication unit and an application unit connected to one another via an internal communication link. The internal communication link may particularly be a cabled connection within a motor vehicle, for example a vehicle bus system such as CAN bus, Flex Ray or suchlike bus systems. An Ethernet connection is also conceivable in principle.

The communication unit has at least one radio frequency antenna particularly for participation in WLAN communication based on the IEEE 801.11p standard and at least one transceiver for physical data transmission and also a computation unit for physical transmission control. The radio frequency antenna and the transceiver cooperate to activate the physical communication link and transmitting the bit data information in accordance with the physical layer of the OSI layer model for communication protocols.

The computation unit for transmission control is configured, in accordance with the data link layer of the OSI layer model for communication protocols, to organize the physical data transmission and to control access to the transmission medium.

The application unit of the communication system, which application unit is communicatively connected to the communication unit, also has at least one computation unit that is set up to execute application programs, to control access by the application programs to the vehicle-to-environment communication and to execute data security applications, particularly authentication of data.

Control of access by the application programs to the vehicle-to-environment communication means particularly control of the logical links for the process communication of two systems in accordance with the data link layer (session layer) of the OSI layer model for communication protocols, conversion of system-dependent presentation of the data into a system-independent form for syntactically correct data interchange between various systems in accordance with the presentation layer of the OSI layer model for communication protocols and mediation for the access by the application programs to the communication in accordance with the application layer of the OSI layer model for communication protocols.

The OSI layer model for communication protocols additionally has provision for a network layer for forwarding the data packets, including pathfinding (routing), between communication subscribers and a transport layer for segmenting the data stream and for data flow control.

2. Related Art

The more accurate functions of the individual layers of the OSI layer model are known to a person skilled in the art and therefore do not need to be explained in more detail at this juncture, especially since they can also be found in many standards, particularly including for wireless communication based on the WLAN standard.

In this connection, the ETSI (European Telecommunications Standards Institute) proposes standardization for the communication of intelligent transport systems (ITS), as are used in vehicle-to-environment communication, for what is known as an ITS station model, the content of which resorts to the OSI layer models.

Thus, the physical layer and the data link layer of the OSI layer model form a layer that is referred to as "ITS access technologies". The network layer and the transport layer are combined in the ITS station model as an "ITS network & transport" layer. These layers are transport-oriented, i.e., they relate to data transmission in the physical sense regardless of the content of the data to be transmitted.

The layers that follow the aforementioned layers (data link layer, presentation layer and application layer) in the OSI layer model are combined in the ITS station model as an "ITS facilities" layer. They are application-oriented, i.e., prepare the transmitted data made available in the communication network for the individual applications without the application needing to be concerned with the physical manner in which the data transmission has taken place. This allows the application programs to be based on certain information standards without the application programs themselves having control of the communication engineering or needing to condition the data for data transmission. The ITS facilities layer is therefore a kind of interface between the application programs (applications) and the technical communication procedure.

Against the background of the tasks outlined above for the individual layers, it has therefore been customary to date to integrate the tasks of the ITS network & transport layer, i.e., the network layer and the transport layer based on the OSI layer model, which are frequently also referred to as a communication stack, into the communication unit as well, the communication unit controlling the conduct of the physical data communication.

However, this split known from the prior art has the disadvantage that during the handling of the communication stack in the communication module, i.e., while the tasks of the ITS network & transport layer are being performed, there should still be no evaluation of security information pertaining to the data, since otherwise the data link between communication module and application unit is provided in unsecured fashion or needs to be secured again.

SUMMARY OF THE INVENTION

Against this background, it is an object of the present invention to be able to take account of security information during the handling of the communication stack, i.e., performance of the tasks of the ITS network & transport layer, for example for the purpose of prioritizing data.

The invention achieves this object by virtue of the computation unit of the application unit being configured to forward the data packets, including pathfinding in the sense of routing, between the communication subscribers, which are also referred to as network nodes, i.e. undertaking tasks that correspond to the network layer of the OSI layer model for communication protocols. In addition, the computation unit of the application layer is set up, according to the invention, to segment the data stream, i.e., is equipped in accordance with the tasks of the transport layer of the OSI layer model for communication protocols.

Since the data security application is also handled on the application unit, there is therefore already information available about the authenticity of the data from the data security application during handling of the communication stack in accordance with the ITS network & transport layer. This inventive partitioning of the network & transport layer in the application unit is not altogether linked to, any relatively high level of hardware complexity in the overall communication system, since the communication unit, which is frequently in the form of an antenna unit, requires only a relatively low level of computation power. The relatively high level of computation power in the application unit can easily be provided, since it is usually well equipped with processor power anyway. If need be, the processor power can also be increased again in this case. In addition, this configuration allows relatively small communication units, which is of enormous advantage on account of the space problems at the mounting points that are useful for the antenna. The somewhat greater space requirement for the application unit is typically not a problem. A similar situation applies to heat loss, which turns out to be relatively low for the communication unit, which is accommodated in environments that are relatively difficult in heat terms, and is somewhat increased in the case of the more easily coolable application unit, which is accommodated in an environment that is simpler in heat terms.

According to an inventive variant of the proposed method, it is even possible for this additionally provided computation power to be jointly used in a flexible manner, for example including for application programs when the computation requirement therefor is increased, when there is currently no computation requirement for handling the communication stack. Furthermore, this achieves a good level of security for the application unit, which to some extent executes safety-relevant driver assistance systems and in so doing can also resort to data from the vehicle-to-environment communication.

If, instead, the data security application were relocated from the application unit to the communication unit in order to be able to access the information from the data security application already when the communication stack is handled in the communication unit, the internal communication link between the communication unit and the application unit, which is usually also jointly used by other vehicle units, would be susceptible to possible manipulations. Incorporation of the communication processing in accordance with the ITS network & transport layer into the application unit even achieves an increase in security, because the data handled for the communication stack are frequently cryptologically encrypted or signed and more difficult to falsify than plain-text information, such as the position or the speed of a communication subscriber for vehicle-to-environment communication.

According to a preferred further development of the inventive communication system, provision is made for the computation unit of the communication unit to be set up to preprocess the data, which involves the sent and received data being filtered and plausibilized. This inventive plausibilization can be effected particularly in respect of the communication paths for the data and/or in respect of the data volume, i.e., in abstract terms formulated by virtue of a check on communication parameters and/or communication partners that are independent of the content of the data.

In this connection, it has been found to be particularly useful for the preprocessing to be in the form of a kind of prefiltering with dynamic parameterization. It is thus possible for the data collected for the data link layer, for example MAC (Medium Access Control) addresses, to be used for plausibilization and for a trend or alteration in the data over time also to be taken into account on the basis of the increased dynamism. In addition, it is possible for the data of the communication header to be checked and for the data to be taken as a basis for actually filtering the data to be forwarded, that is to say attaining data reduction.

According to a further advantageous aspect of the inventive communication system, provision may be made for the computation unit of the application unit to be in the form of a multiprocessor unit that has a plurality of processors and/or at least one processor having a plurality of processor cores that can be configured or are configured for separate handling of program instructions or different applications. It is also possible for a plurality of processors to be combined with one or more processors having a plurality of processor cores. The overall effect achieved by this is a modular design of the application unit, which can thus be flexibly matched to particular uses in different vehicles and can be optimized for specific tasks.

According to a particularly preferred form of this embodiment, provision is made for a first processor or a first processor core of the multiprocessor unit to be set up to derive a localization for its own position, possibly relative to the position of the sender of the data, including driving-dynamics information, from data from a GNSS system, driving-dynamics data and possibly the received data. In this case, it is also possible for the time base of the different subscribers in the communication network to be aligned, for example for the time of a clock master in the communication network to be adopted for synchronization.

The processor used for this purpose is preferably a digital signal processor (DSP) with a structure optimized for the computation operations that are to be performed, since the same computation tasks repeatedly need to be executed as quickly as possible on a recurrent and more or less continuous basis. The processor or processor core used for this purpose is then specifically designed for these tasks.

Preferably, provision is also made for a second/further processor or a second/further processor core of the multiprocessor unit to be set up to accomplish the communication-oriented tasks for forwarding the data packets, including pathfinding, and for segmenting the data stream in accordance with the specifications of the ITS network & transport layer. For this purpose, the processor provided is optimally a freely configurable microprocessor, since the tasks arising in this context may be entirely different, as a result of which a processor that can be set up flexibly is advantageous.

In addition, a third/further processor or third/further processor core of the multiprocessor unit may be set up to execute the different application programs. On account of the wide variety of different programs, a microprocessor is suitable as the processor or processor core in this case too.

In addition, the fourth/further processor or fourth/further processor core of the multiprocessor unit provided may be a processor for executing data security applications (security), which processor may particularly be in the form of a separate chip for hardware acceleration.

Naturally, the invention also allows certain instances of the aforementioned first to fourth processors or processor cores to be combined with one another, particularly if the time horizon and the computation power permit a plurality of tasks to be accomplished in a processor/processor core.

It is also conceivable for the computation power of one of the processors or processor cores to be temporarily provided for accomplishing computation tasks of the other processors or processor cores if the processor or processor core provided is not being used to full capacity and the other processors or processor cores have an increased workload.

The invention additionally relates to program code for configuring the computation unit of a communication unit and/or an application unit in accordance with the previously described communication system or portions thereof.

A particularly preferred use for the inventive communication system is in a motor vehicle.

BRIEF DESCRIPTION OF THE DRAWINGS

Further advantages, features and opportunities for application of the present invention will also emerge from the following description of an exemplary embodiment and the drawings. In this case, all features described and/or graphically illustrated form the subject matter of the present invention on their own or in any combination, including regardless of their synopsis in the claims or the back-references therein.

In the drawings.

DETAILED DESCRIPTION OF THE PRESENTLY PREFERRED EMBODIMENTS

Figure 1:
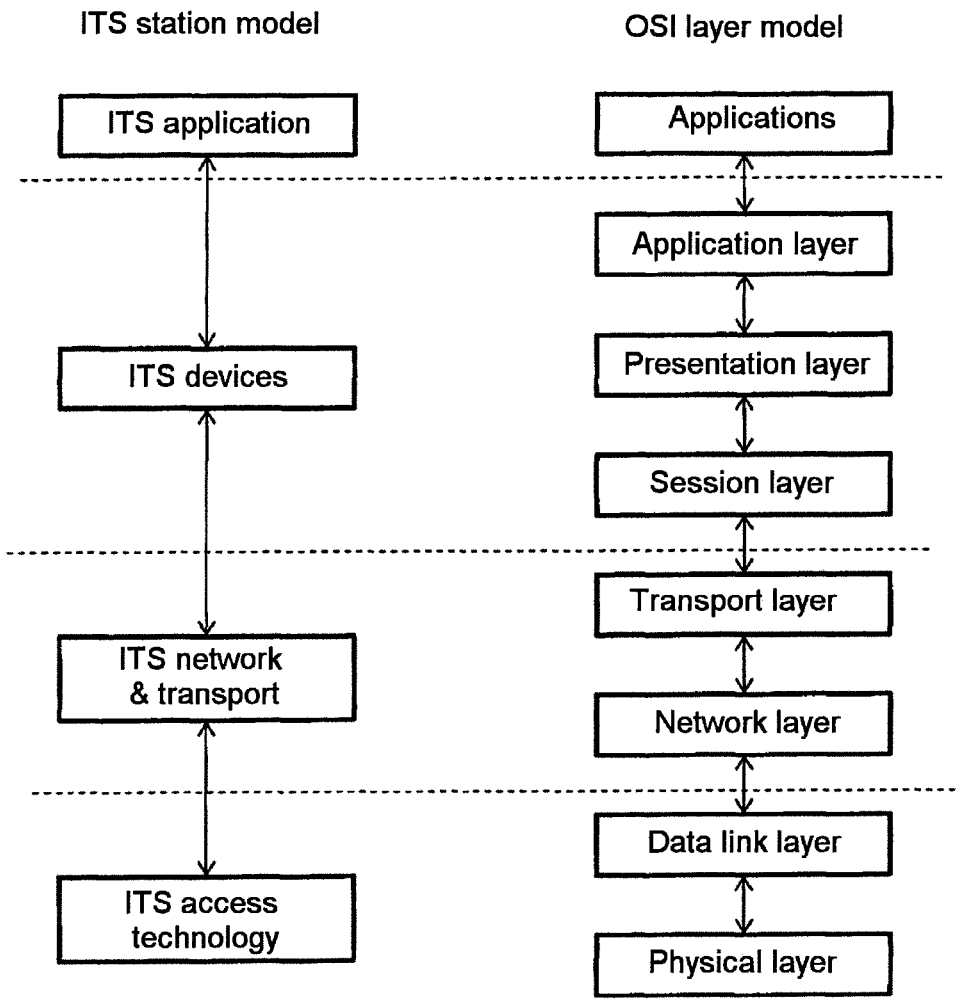
FIG. 1 shows an overview of the known models ITS station model and OSI layer model.

FIG. 1 graphically illustrates the comparison—already described in detail—of the ITS station model for the communication procedure for the intelligent transport system (ITS) and the OSI layer model once again, with the respective task areas that belong to one another being represented by the horizontal dashed lines. Strictly speaking, the applications illustrated above are no longer part of the OSI layer model but have also been shown in respect of the ITS application layer for the purposes of correlation and relate to the applications based on the communication.

A detailed description of the diagram has also been provided, which means that it is possible to dispense with further explanations at this juncture.

Figure 2:
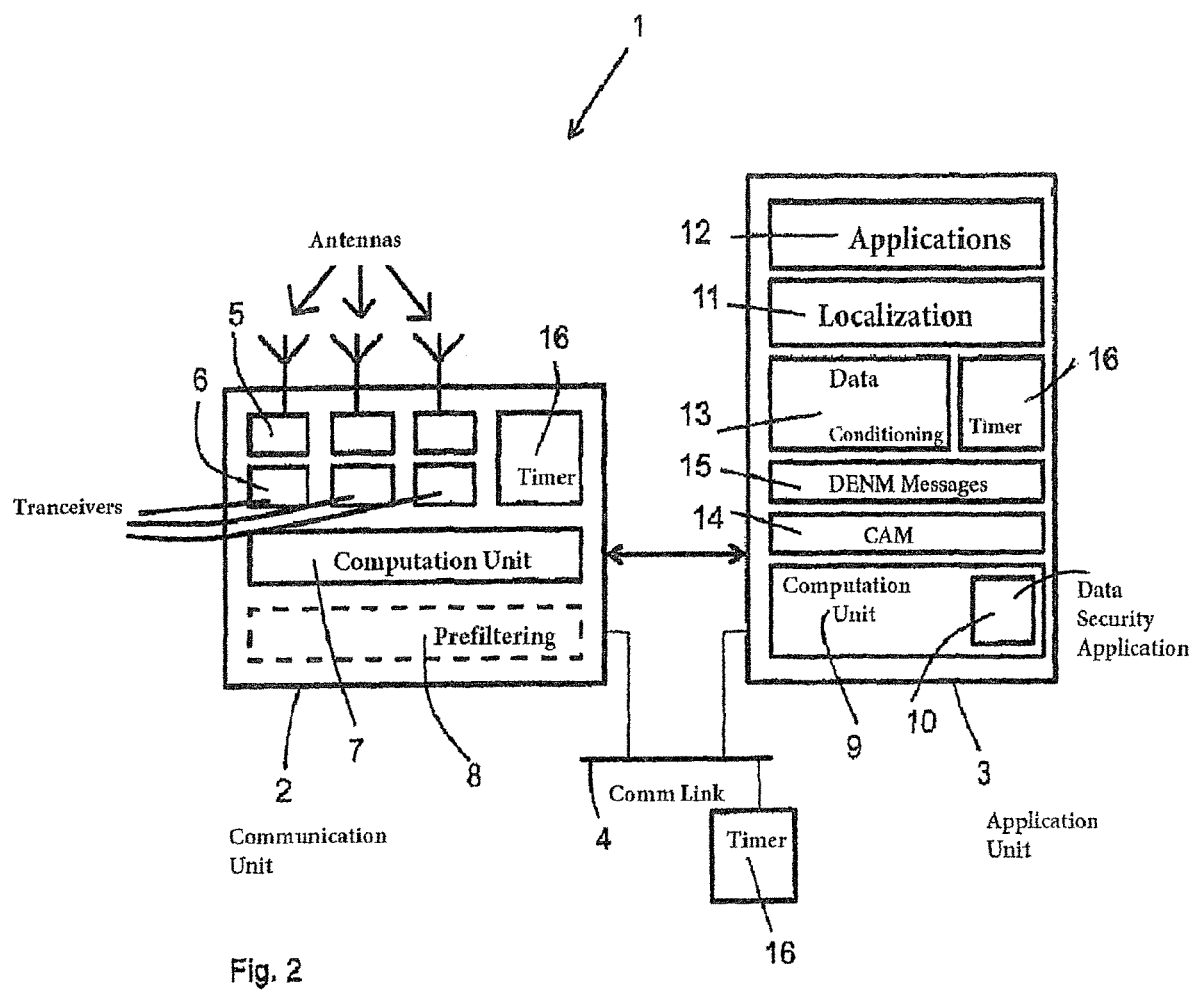
FIG. 2 shows the architecture of an inventive communication system having a communication unit and an application unit on the basis of a schematic illustration.

The communication system 1 shown in FIG. 2 for an embodiment of the present invention is based on the ITS station model and is described in detail below.

The communication system 1, which is, in the preferred embodiment, used in a vehicle, not shown, has a communication unit 2 and an application unit 3 that can communicate with one another via an internal communication link 4 in the form of a vehicle bus system.

The communication system 1 is configured to participate in the vehicle-to-environment communication in accordance with the IEEE 802.11p standard. To this end, the communication unit 2 is equipped with a radio frequency antenna 5 and a transceiver 6 for WLAN communication based on this standard.

Besides the radio frequency antenna 5 and the transceiver 6 for participation in the vehicle-to-environment communication, the communication unit has further antennas and transceivers, not provided with a reference symbol, that are equipped for mobile radio and reception of global satellite position signals (GNSS), for example. This communication is not considered further for the present invention, however.

In addition, the communication unit 2 has computation unit 7 for physical transmission control that organizes the physical data transmission and coordinates access to the transmission medium by the transceiver 6 and the radio frequency antenna 5. For this coordination, MAC control (Medium Access Control) is implemented, for example.

The computation unit 7 for transmission control, the transceiver 6 and the radio frequency antenna 5 are associated with the ITS access layer of the ITS station model.

When the data has been received, they are subjected to prefiltering 8, this being optional, for example in order to take the communication addresses and/or the communication volume and/or the content of the communication header as a basis for filtering out erroneous reports or attempts at fraud in the communication or reducing the number of messages to be forwarded to the application unit.

The data that have possibly been subjected to prefiltering are then transmitted via the vehicle bus system 4 to the application unit 3, in which the data are processed further in a computation unit 9 for the purpose of forwarding the data packets, including the pathfinding (routing) between communication subscribers and for the purpose of segmenting the data stream. These tasks correspond to the ITS network & transport layer.

In parallel therewith, the data are checked in a data security application, which is preferably implemented as a combined hardware and software solution, so that, by way of example, the authenticity of the data is already available during handling of the communication stack, such as it corresponds to the ITS network & transport layer of the ITS station model. The handling of the tasks of the ITS network & transport layer in the computation unit 9 and the handling of the data security application 10 are preferably effected in parallel.

The processing of these tasks that are associated with the ITS network & transport layer and can be attributed to the communication management is preferably handled in a separate processor or separate processor core of the application unit. The processing of the data security application is preferably performed in a dedicated processor that is preferably in the form of a dedicated accelerator for the data security application.

This is followed by the handling for the ITS facilities layer, in which logical links for the process communication of a plurality of systems are organized, the system-dependent presentation of particular information in a system-dependent form is implemented and access by the application programs to the communication is mediated.

For this handling, the vehicle-to-environment communication particularly involves localization 11 taking place, which involves the vehicle position and driving-dynamics data being ascertained. In addition, data from the vehicle are provided in the form of a vehicle data provider, the data preferably being tapped off from a vehicle bus.

For the purpose of preparation and central presentation on subsequent applications 12, which are preferably in turn executed in a separate processor or processor core, the data obtained in the localization 11 are taken as a basis for producing a local dynamic map and/or a relevance filter for the data in a data conditioning section 13. In addition, cooperative awareness messages 14 (CAM) are produced for continuous transmission, the messages compiling a piece of basic information for the vehicles and infrastructure units that participate in the vehicle-to-environment communication and being received by all subscribers.

The localization 11, the data conditioning 13 and the handling of the cooperative awareness messages 14 (CAM) can be associated with the ITS facilities layer, at which the actual communication procedure is at an end.

The data produced in this manner are then available to the applications 12, which, when a hazard report is identified, also include the transmission of what are known as DENM messages 15 (Decentralized Environmental Notification Message), for example.

Preferably, the localization 11 is also handled in a separate processor or processor core. The same applies to the applications 12, including the DENM messages 15. The data conditioning 13 and the cooperative awareness messages 14 are preferably handled on the processor or processor core for the communication management, together with the modules for the ITS network & transport layer.

Each of the participating units, that is to say particularly the communication unit 2, the application unit 3 and possibly also other units connected to the internal communication link 4, have a timer 16, a clock master of which units can prescribe or synchronize the system time.

The use of a plurality of processor sensors or processor cores for the various tasks of the application unit 3 and the relocation of the computation unit 9 for forwarding the data packets and segmenting the data stream to the application unit 3 allow optimum incorporation of the data security application 10 into the communication stack of the communication procedure on the basis of the ITS station model, so that security information, such as authentication of the data, can already have an influence on the handling of the communication flow.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A communication system for vehicle-to-environment communication in which data to be transmitted are transmitted wirelessly as data packets, the communication system comprising:
   a communication unit;
   an application unit arranged physically separately from the communication unit; and
   a vehicle internal bus system connecting the communication unit with the application unit,
   wherein:
      the communication unit has a radio frequency antenna and a transceiver for physical data transmission and a first computation unit configured to control the physical data transmission,
      the application unit has at least one second computation unit configured to execute application programs, to control access by the application programs to the vehicle-to-environment communication, and to execute data security applications, and
      the communication unit and the first computation unit provide functions of the physical layer and the data link layer of the OSI layer model, and the at least one second computation unit of the application unit provides functions of the application layer, the network layer and the transport layer of the OSI layer model and is thereby configured to forward the data packets, and provide data packet pathfinding, between communication subscribers, and to segment a data stream,
   wherein the at least one second computation unit of the application unit comprises a multiprocessor unit having at least one selected from the group consisting of (i) a plurality of processors and (ii) a multi-core processor having a plurality of processor cores,
   wherein a first processor of the multiprocessor unit, or a first processor core of the multi-core processor, is configured to derive a localization of its own position, including driving-dynamics information, from received data,
   wherein data received in the localization provides a basis for producing: (a) a local dynamic map, and (b) a relevance filter for the data in a data conditioning section of the application unit, and
   wherein the communication system is configured to, during a period of time in which the first computation unit is not required for controlling physical data transmission in the communication unit, use computation power of the first computation unit together with computation power of the at least one second computation unit to assist the at least one second computation unit in execution of the application programs.

2. The communication system as claimed in claim 1, wherein the first computation unit of the communication unit is configured to preprocess the data by filtering and determining the plausibility of sent and received data.

3. The communication system as claimed in claim 2, wherein the preprocessing comprising prefiltering with dynamic parameterization.

4. The communication system as claimed in claim 1, wherein a second processor of the multiprocessor unit, or a second processor core of the multi-core processor, is configured to perform communication-oriented tasks.

5. The communication system as claimed in claim 4, wherein a third processor of the multiprocessor unit, or a third processor core of the multi-core processor, is configured to execute application programs.

6. The communication system as claimed in claim 5, wherein a fourth processor of the multiprocessor unit, or a fourth processor core of the multi-con processor, is configured to execute data security applications.

7. A non-transitory computer-readable medium storing program code for execution by at least one selected from the group consisting of: (a) the first computation unit and (b) the application unit, of the communication system as claimed in claim 1.

8. The communication system as claimed in claim 1, wherein the communication system is arranged in a motor vehicle.

9. The communication system as claimed in claim 1, wherein, when a hazard report is identified, the data associated with the report includes Decentralized Environmental Notification Messages (DENM).

10. The communication system as claimed in claim 1, wherein cooperative awareness messages (CAMs) are produced for continuous transmission, the cooperative awareness messages compiling information for the vehicles and infrastructure units that participate in the vehicle-to-environment communication and being received by all communication subscribers.

* * * * *